United States Patent
Bernardy et al.

(10) Patent No.: US 8,938,917 B1
(45) Date of Patent: Jan. 27, 2015

(54) STOWABLE SHELTER SYSTEM

(71) Applicants: Ryan Curtis Bernardy, Crescent, OK (US); Thomas M Bernardy, Jr., Crescent, OK (US); Michael Nilson, Oklahoma City, OK (US); Robert Preston Conser, Edmond, OK (US); Jimmy Bollman, Oklahoma City, OK (US)

(72) Inventors: Ryan Curtis Bernardy, Crescent, OK (US); Thomas M Bernardy, Jr., Crescent, OK (US); Michael Nilson, Oklahoma City, OK (US); Robert Preston Conser, Edmond, OK (US); Jimmy Bollman, Oklahoma City, OK (US)

(73) Assignee: Whiteboard Instashelter LLC, Crescent, OK (US)

( * ) Notice: Subject to any disclaimer, the term of this patent is extended or adjusted under 35 U.S.C. 154(b) by 0 days.

(21) Appl. No.: 14/250,694

(22) Filed: Apr. 11, 2014

(51) Int. Cl.
*E04H 9/06* (2006.01)
*E04H 9/14* (2006.01)
*E04H 15/34* (2006.01)

(52) U.S. Cl.
CPC . *E04H 15/34* (2013.01); *Y10S 52/12* (2013.01)
USPC ............. 52/29; 52/69; 52/169.6; 52/DIG. 12; 52/71

(58) Field of Classification Search
CPC .............. E04H 9/06; E04H 9/14; Y10S 52/12
USPC ............. 52/29, 36.4, 69, 71, 79.1, 79.5, 79.9, 52/169.6, DIG. 12; 108/48; 312/313–316
See application file for complete search history.

(56) References Cited

U.S. PATENT DOCUMENTS

| | | | |
|---|---|---|---|
| 3,629,982 A | 12/1971 | Ballay | |
| 3,866,547 A * | 2/1975 | Guyton | 108/38 |
| 4,310,207 A * | 1/1982 | Adams, Jr. | 312/314 |
| 4,995,322 A * | 2/1991 | Frederick | 108/44 |
| RE34,468 E * | 12/1993 | Rau et al. | 296/26.02 |
| 5,867,947 A | 2/1999 | Holtz | |
| 6,151,841 A | 11/2000 | Green | |
| 6,223,479 B1 * | 5/2001 | Stockli | 52/68 |
| 6,325,085 B1 * | 12/2001 | Gower | 135/90 |
| 6,415,558 B1 | 7/2002 | Cherry | |
| 6,539,674 B2 | 4/2003 | Arnold | |
| 6,968,653 B2 | 11/2005 | Stapleton | |
| 7,464,502 B2 | 12/2008 | Herrera | |

(Continued)

FOREIGN PATENT DOCUMENTS

WO 2013090793 A1 6/2013

OTHER PUBLICATIONS

Staying Home Corporation, Hide Away Brochure, Jun. 27, 2013.

*Primary Examiner* — Robert Canfield
(74) *Attorney, Agent, or Firm* — D. Ward Hobson

(57) ABSTRACT

A stowable shelter assembly configured to be securely anchored to a support at two or more anchor or attachment points to provide a greater level of security and stability includes a first member having a bottom end, a top end, and sides extending between the top end and the bottom end. The bottom end is attachable to a support. A second member has a back end coupled with the top end of the first member, a front end, and sides extending between the back and front ends. The second member includes an anchoring member extending past the front end and is movable between a stowed position where the first and second members are co-planar such that the front end of the second member is positioned a distance above the bottom end of the first member, and a deployed position where the first and second members are angled and the anchoring member is positioned partially below the front end of the first member and spaced a distance from the bottom end to define a shelter space.

18 Claims, 9 Drawing Sheets

(56) References Cited

U.S. PATENT DOCUMENTS

| | | | |
|---|---|---|---|
| 7,841,136 B2 * | 11/2010 | Czyznikiewicz | 52/71 |
| 2004/0163327 A1 * | 8/2004 | Cash | 52/27 |
| 2011/0132421 A1 | 6/2011 | Dolsby | |
| 2012/0079968 A1 | 4/2012 | von Bereghy | |
| 2012/0151854 A1 | 6/2012 | Scott, IV | |
| 2012/0222367 A1 | 9/2012 | Wirtz | |
| 2013/0125478 A1 | 5/2013 | Trochan | |
| 2014/0033619 A1 * | 2/2014 | Merchant | 52/71 |

* cited by examiner

STOWABLE SHELTER SYSTEM

BACKGROUND

Natural disasters, such as storms, hurricanes, tornadoes, and earthquakes cause damage to multiple structures, such as homes, business premises, schools, hospitals, and other buildings and structures. Sometimes, significant structural damage may occur, including partial or complete collapse, falling walls, roofs, or entire floors and buildings, or complete destruction of structures causing injuries and even death to humans occupying such structures.

For example, earthquakes frequently result in human injuries and fatalities due to partial or complete structural collapses, where occupants of the structure are injured or trapped by falling debris, including floor, wall, or roof fragments, falling furniture, or other debris or objects. Further, tornadoes, or hurricane-type storms cause structural damage via rotating or straight-line winds, which frequently partially or completely destroy structures, often leaving behind only the structures foundations.

Because natural disasters come with varying warning times, ranging from days in the case of hurricanes, hours in the case of severe storms, minutes in the case of tornadoes, and no warning at all in the case of earthquakes, the potential for human injuries or fatalities is compounded where relatively large groups or people gather in structures such as in hospitals, schools, day-care centers, universities, office buildings, nursing homes, or other similar locations. Unfortunately, such structures often lack adequate natural disaster shelters, or in some cases have large centrally-located shelters where a large number of people have to be quickly moved or evacuated to in the event of a natural disaster.

Some people have mobility difficulties or require a longer time to evacuate to a centrally-located shelter, such as nursing home residents, hospital patients, or school-age or kindergarten-age children, for example. As such, large centrally-located shelters are not always practical, and their usefulness decreases with decreased warning times for some natural disasters. Further, because some centrally-located shelters are below-ground, such below-ground shelters introduce their own set of drawbacks, including difficult access for limited-mobility persons (e.g., the elderly, wheel chair of hospital bed bound persons), danger of flooding and/or gas leaks, and the potential for people to become trapped inside the below-ground shelter by debris blocking the exits To that end, it would be advantageous to provide an above-around stowable shelter system configured to be securely anchored to a support when in use and conveniently stowed when not in use so as to be rapidly and easily deployed when needed such that people can be sheltered in place without requiring movement of people to a central location. It is to such stowable shelter systems and to methods for using thereof that exemplary embodiments of the inventive concepts disclosed and claimed herein are directed.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
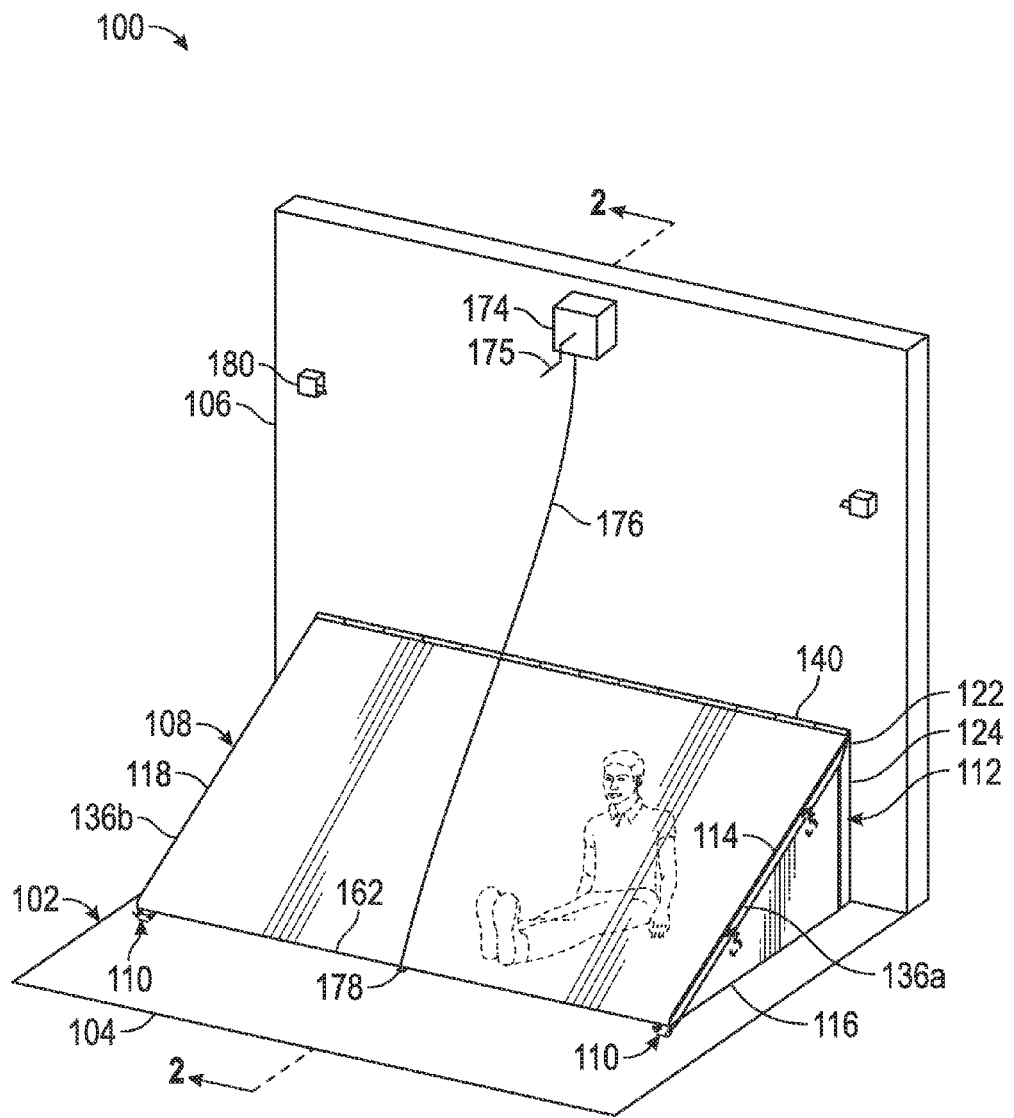
FIG. 1 s a perspective view of an exemplary embodiment of a stowable shelter system according to the inventive concepts disclosed herein shown in a deployed position.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed.

As used herein the notation "a-n" appended to a reference numeral is intended as merely convenient shorthand to reference one, or more than one, and up to infinity, of the element or feature identified by the respective reference numeral (e.g., 134*a-n*). Similarly, a letter following a reference numeral is intended to reference an embodiment of the feature or element that may be similar, but not necessarily identical, to a previously described element or feature bearing the same reference numeral (e.g., 148, 148*a*, 148*b*, etc.). Such shorthand notations are used for purposes of clarity and convenience only, and should not be construed to limit the instant inventive concept(s) in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are generally directed to shelter assemblies and systems configured to be securely attached to a support at two or more anchor or attachment points, and to be conveniently stowed when not in use and quickly and easily deployed by users. In some embodiments, a stowable shelter assembly may be substantially triangular in shape, and in some embodiments a stowable shelter may be substantially rectangular or square in shape. Stowable shelter systems according to the inventive concepts disclosed herein are configured to be installed above-ground level or above a support, indoors or outdoors and are configured to be anchored to a support at two or more or multiple anchor or attachment points.

Referring now to FIGS. 1-4, shown therein is an exemplary embodiment of a stowable shelter system 100 constructed according to the inventive concepts disclosed herein. The stowable shelter system 100 is configured to be attached to a support 102 including a horizontal portion 104 and a vertical portion 106, and includes a stowable shelter assembly 108 and one or more support anchors 110.

The support 102 may be any desired manmade structure or natural body or object, such as a building, school, hospital, house, or public building. For example, the horizontal portion 104 may be a basement, a floor, a roof, a patio, a foundation, a concrete slab, a parking structure deck or level, or a stairwell level or platform. Similarly, the vertical portion 106 may be an interior wall, an exterior wall, a retaining wall, a stairwell, a basement wall, a support column, an elevator shaft, a classroom wall, or any other manmade vertical structure or natural object or body. In some embodiments the horizontal portion 104 may include a substantially flat surface having any desired shape, and in some embodiments the vertical portion 106 may be omitted, or multiple vertical portions 106 may be implemented.

The stowable shelter assembly 108 includes a first member 112, a second member 114, a side member 116, and a side member 118.

The first member 112 includes a bottom end 120, a top end 122, and a pair of sides 124a and 124b which cooperate to define a plane 126. The first member 112 may be implemented as a generally planar body and may be constructed of any desired material, including but not limited to, metals, alloys, non-metals, steel, titanium, carbon fiber, polymers, resins, ceramics, concrete, reinforced concrete, bullet resistant material, composite materials, or combinations thereof.

In some embodiments, the first member 112 may be generally rectangular in shape, while in some embodiments the first member 112 may be substantially square or may have any other desired shape, as will be appreciated by persons of ordinary skill in the art having the benefit of the instant disclosure. Further, embodiments of the first member 112 may include reinforcing or bracing structures, such as struts, ribs, braces, rods, or any other suitable reinforcing structure, or combinations thereof.

The first member 112 is attached to the horizontal portion 104 of the support 102 via a flange 128 which has one or more openings 130 formed therein. One or more anchor bolts 133 (FIG. 2) are used to attach the flange 128 to the support 102 such that the top end 122 of the first member 112 extends a distance above the horizontal portion 104 of the support 102 at any desired location, such as a location adjacent to the vertical portion 106 of the support 102 in some embodiments. It is to be appreciated that the first member 112 may be attached to the horizontal portion 104 of the support 102 in any desired manner such as via welds, seams, joints, screws, bolts, adhesives, or combinations thereof. Further, in some embodiments, the first member 112 may be partially embedded or encased in the horizontal portion 104 of the support 102, while in some embodiments the first member 112 and the horizontal portion 104 of the support 102 may be formed as a unitary body.

It is to be understood that in some embodiments, the top end 122 may be provided with a flange, which may be implemented similarly to the flange 128 and may function to provide additional space for occupants of the storm shelter assembly as will be appreciated by persons of ordinary skill in the art having the benefit of the instant disclosure. In some embodiments where the top end 122 is provided with a flange, the second member 114 may be pivotally coupled with an end or any other desired portion of the flange, for example.

The second member 114 may by implemented similarly to the first member 112 and has a first end 132 pivotably or rotatably coupled with the top end 122 of the first member 112, a second end 134, a third side 136a and a fourth side 136b extending between the first end 132 and the second end 134, and at least one anchoring member 138. In some embodiments, the second member 114 may be generally rectangular in shape, while in some embodiments the second member 114 may be substantially square or may have any other desired shape, as will be appreciated by persons of ordinary skill in the art having the benefit of the instant disclosure.

The first end 132 is pivotably, movably, or rotatably coupled with the top end 122 of the first member 112 such that the second member 114 is movable relative to the first member 112 between a first position where the first member 112 and the second member 114 are substantially coplanar with one another, and a second position where the second member 114 is angled relative to the first member 112 at an angle of about 45°, or an angle varying between about 15° and about 90°, between about 30° and about 60°, or between about 45° and about 60°, for example. In some embodiments, the first end 132 is pivotably coupled with the top end 122 via a hinge 140, which may be implemented as a single hinge 140 substantially spanning the first end 132, or as two or more separate hinges 140 operably coupled with the first end 132 and the top end 122. In some embodiments, the hinge 140 may include a spring or other biasing or damping mechanism operably coupled therewith, while in some embodiments the hinge 140 may include one or more pneumatic, hydraulic, elastomeric, mechanical, or any other desired biasing or damping mechanism so as to allow a user to effortlessly and safely deploy and stow the stowable shelter assembly 108, as will be appreciated by persons of ordinary skill in the art having the benefit of the instant disclosure. Further, in some embodiments, the hinge 140 may be implemented as a locking hinge 140 configured to lock the first member 112 and the second member 114 relative to one another at any desired angle, or may be configured to limit the movement of the second member 114 relative to the first member 112 to a predetermined angle as will be appreciated by persons of ordinary skill in the art having the benefit of the instant disclosure. Some embodiments of the second member 114 may include one or more reinforcing or bracing members, such as ribs, thickened areas, rods, braces, cross-members, trusses, struts, or combinations thereof.

In some embodiments, the second member 114 may include a surface 142 (FIG. 4) configured to be used as a writing board such as a whiteboard, interactive-whiteboard, a dry-erase board, and/or a blackboard. In some embodiments, the surface 142 may be configured to be used as a projection screen or to support a video monitor, a roll-op projection screen, or other similar devices or objects. In some embodiments, the surface 142 may be omitted.

The anchoring member 138 may be implemented as an elongated member (e.g., a beam, truss, leg, or rod) and includes an anchoring end 144 extending at least partially past the second end 134 of the second member 114, the anchoring end 144 being configured to anchor the side member 118 to the support 102 via the support anchor 110 as described below. The anchoring member 138 may be constructed of any desired material such as metals, alloys, non-metals, or combinations thereof, and may be attached to the second member 114 in any desired manner such as welds, joints, seems, adhesives, fasteners, clamps, brackets, or combinations thereof. In some embodiments, the anchoring member 138 and the second member 114 may be formed as a unitary body, such as via casting, machining, molding, or any other desired method or technique.

In some embodiments, the anchoring member 138 spans the distance between the first end 132 and the second end 134 of the second member 114, while in some embodiments, the anchoring member 138 may extend partially between the first end 132 and the second end 134. Further, while anchoring member 138 is shown as oriented substantially perpendicularly relative to the second end 134 and substantially parallel relative to the third side 136a and the fourth side 136b, the anchoring member 138 may be angled at any desired angle relative to the second end 134 and/or the sides 136a and 136b. In some embodiments, the anchoring member 138 may be pivotably coupled with the first member 112 such as via the hinge 140 as will be appreciated by persons of ordinary skill in the art having the benefit of the instant disclosure. Further, in some embodiments, the anchoring member 138 may be movable (e.g., pivotably) relative to the second member 114.

While two anchoring members 138 are shown in FIGS. 1-4 positioned adjacent to the sides 136a and 136b respectively, embodiments of the inventive concepts disclosed herein may be implemented with any desired number of anchoring members 138 positioned at any desired location along the second member 114. For example, some embodiments of the inventive concepts disclosed herein may include a single anchoring member 138, two anchoring members 138, three anchoring members 138, or four or more anchoring members 138, depending on the width of the second member 114 such that the number of anchoring members 138 used is configured to safely anchor the second member 114 to the support 102 and/or to structurally reinforce the second member 114. Further, in some embodiments where more than one anchoring member 138 is implemented, two or more anchoring members 138 may intersect with one another and/or may be connected with one another as will be appreciated by a person of ordinary skill in the art having the benefit of the instant disclosure.

The anchoring end 144 includes an anchor-engaging portion 146 and a locking lever 148 movably coupled with the anchoring end 144 such that the locking lever 148 is movable relative to the anchor-engaging portion 146 and locking lever 148 may be omitted, and the anchoring end 144 may be implemented with any desired mechanism configured to selectively engage and disengage the anchoring end 144 to the support anchor 110, such as for example a latching or locking mechanism built into the support anchor 110 and/or the second member 114.

The side member 116 includes a side 150 and an end 152. The end 152 is pivotably or rotatably coupled with the side 124a of the first member 112 via a hinge 154 (FIG. 3) so that the side member 116 is movable between a first position where the side member 116 is substantially parallel to the plane 126 defined by the first member 112 when the stowable shelter assembly 108 is in the stowed position (FIGS. 3-4), and a second position where the aide member 116 may be implemented as a right triangle, with the end 152 being a leg of the right triangle, and the side 150 being the hypotenuse of the right triangle, and the side 150 and the end 152 intersecting with one another at an angle of about 45° or an angle varying from about 15° to about 75°, as will be appreciated by persons of ordinary skill in the art having the benefit of the instant disclosure.

Figure 2:
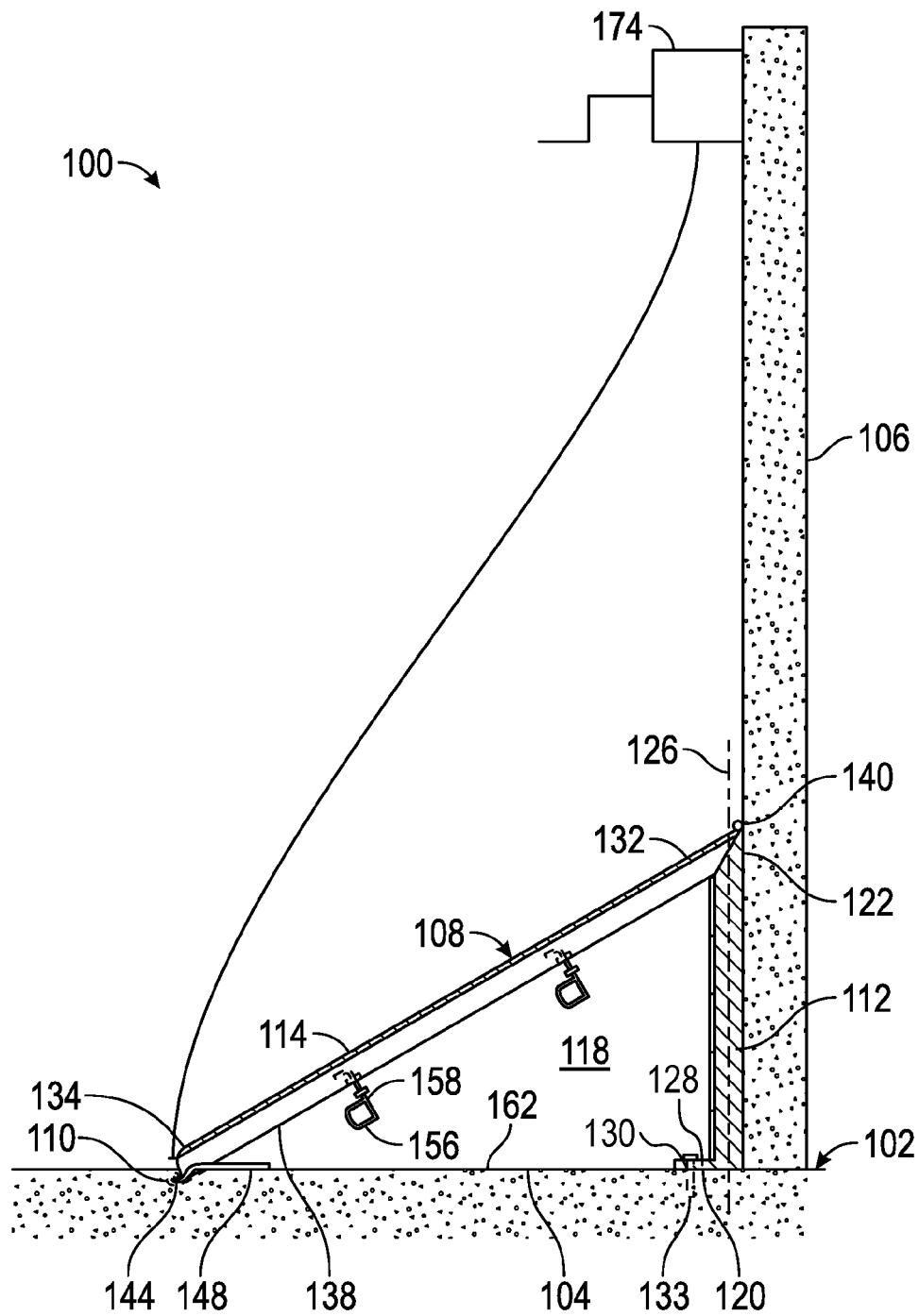
FIG. 2 is a cross-sectional view taken along line 2-2 of FIG. 1.
Figure 3:
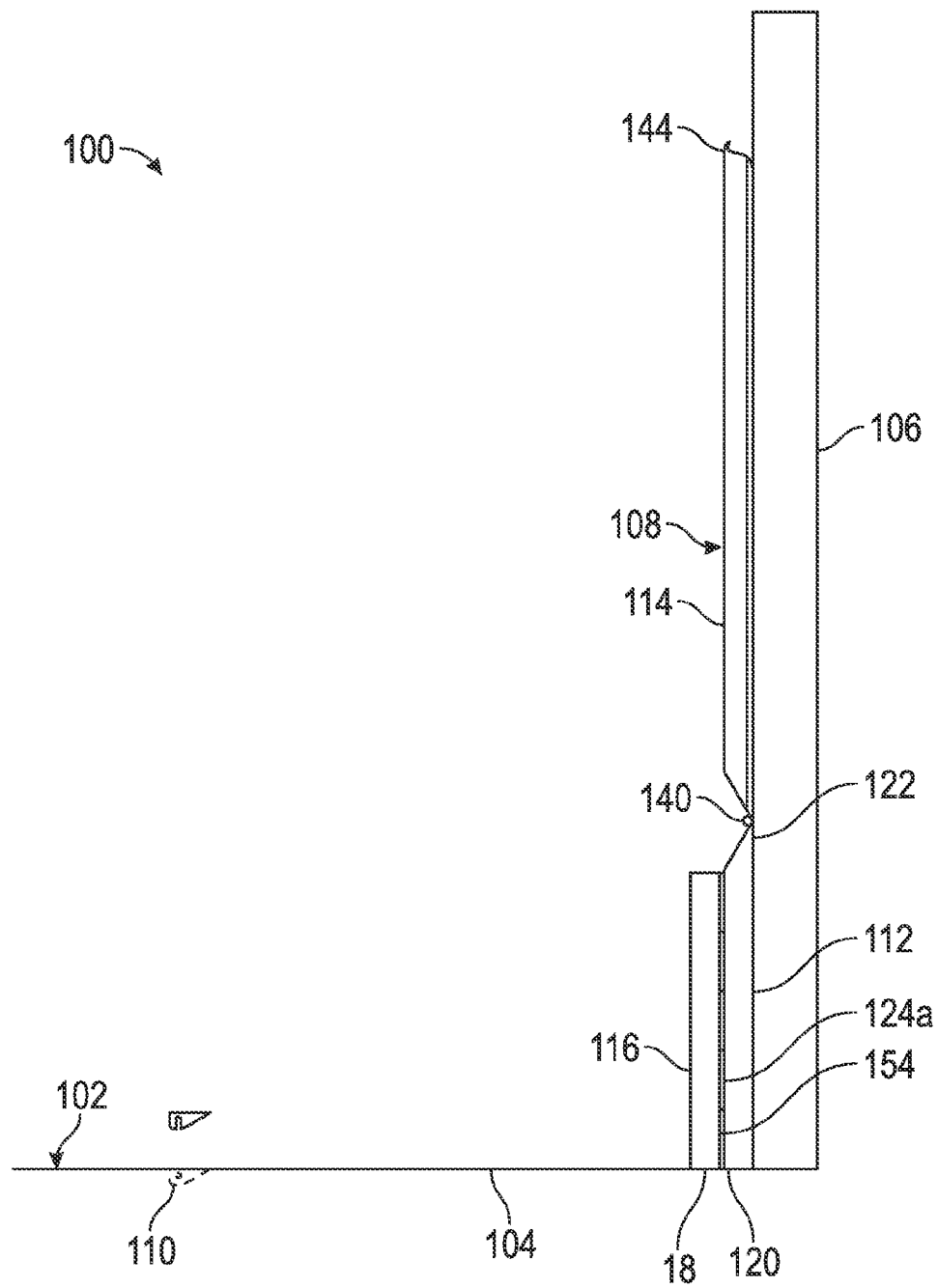
FIG. 3 is a side view of the stowable shelter system of FIG. 1 shown in a stowed position.
Figure 4:
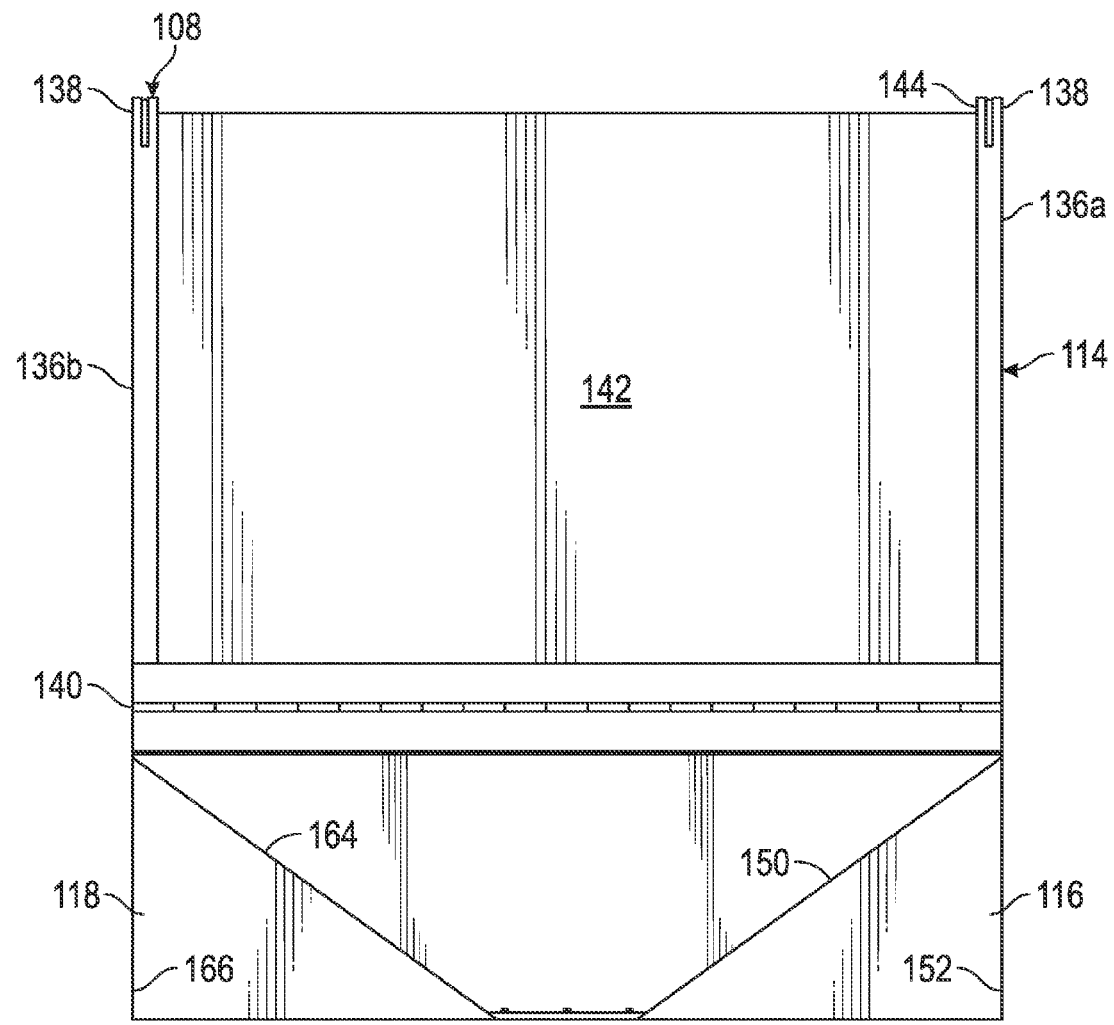
FIG. 4 is a front view of a stowable shelter assembly according to the inventive concepts disclosed herein.

Further, as shown in FIG. 2, the side member 116 includes a latching mechanism 156 configured to releasably engage or lock the side 150 of the side member 116 with the anchoring member 138 when the stowable shelter assembly 108 is in the deployed position. In the embodiment shown in FIG. 2, the latching mechanism 156 includes a rotatable and slidable latch member 158 configured to be matingly received in an opening 160 formed in the anchoring member 138. Any desired number or latching mechanisms 156 and/or latch members 158 may be implemented with embodiments of the inventive concepts disclosed herein such as one, two, or more than two, provided that the latching mechanism 156 is configured to securely engage the side member 116 and the second member 114 with one another so that the side member 116 cooperates with the first member 112 and the second member 114 to define a shelter space 162 when the stowable shelter assembly 108 is in the deployed position. Further, in some embodiments the latching mechanism 156 may be implemented as any desired mechanism configured to be selectively deployed, latched, and/or unlatched by an occupant of the shelter assembly 100 (e.g., from inside the shelter space 162) so as to selectively anchor or lock the side members 116 and/or 119 to the anchoring member 138. In some embodiments, the latching mechanism 156 may be implemented as a deadbolt latch, a hook latch, a crossbar, a cabin hook latch, a cam lock latch, or combinations thereof.

The side member 118 is implemented similarly to the side member 116 (e.g., a mirror-image of the side member 116) and has a side 164 and an end 166, the end 166 pivotably coupled with the side 124b of the first member 112 via a hinge 154a so that the side member 118 is movable between a first position where the side member 118 is substantially parallel to the plane 126 defined by the first member 112, and a second position where the side member 118 is angled relative to the first member 112 (e.g., at about 90°) and the side 164 is releasably coupled or engaged with the anchoring member 138 via a latching mechanism 156, such that the shelter space 162 is further defined by the side member 118.

Figure 5:
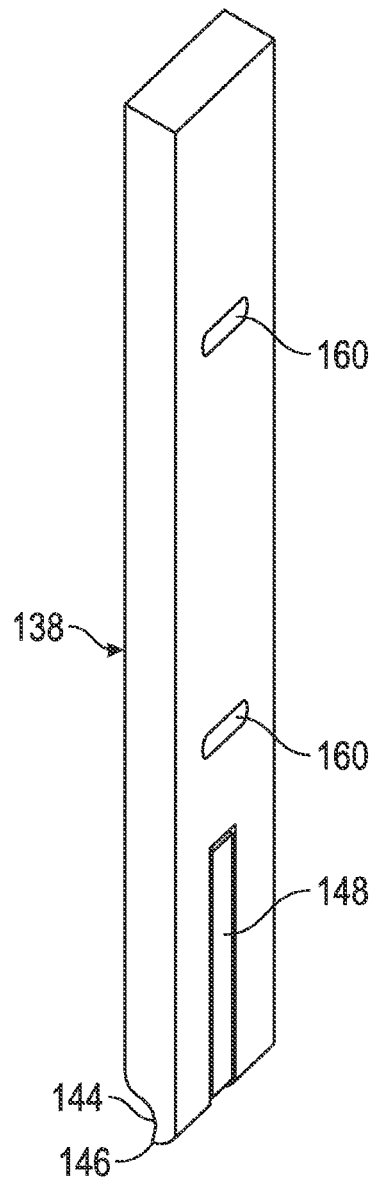
FIG. 5 is a perspective view of an embodiment of an anchoring member according to the present disclosure.

Referring now to FIG. 5, an embodiment of an anchoring member 138 according to the inventive concepts disclosed herein includes a first end 168, and an anchoring end 144. The anchoring end 144 includes the anchor-engaging portion 146 and the locking lever 148. The anchoring member 138 further includes one or more openings 160 configured to matingly receive the latch member 158 therein. For example, the openings 160 may be substantially oval and the latch member 158 may be substantially L-shaped so as to allow the latch member 158 to be inserted into the opening 160 in a first orientation and so as to lock the latch member 158 inside the opening 160 by rotating the latch member 158 to a second orientation (e.g., by about 90°). It is to be understood that the openings 160 may have any desired shape configured to matingly receive a latch member 158 therein such that the latch member 158 may be selectively inserted and/or locked therein. As will be appreciated by persons of ordinary skill in the art having the benefit of the instant disclosure, in some embodiments any desired number of openings 160 may be implemented such as a single opening 160, or two or more openings 160, while in some embodiments the openings 160 may be omitted.

Figure 6:
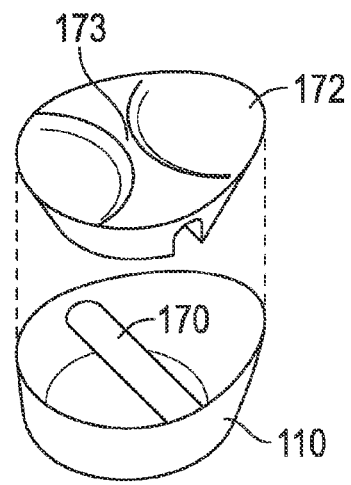
FIG. 6 is a perspective, exploded view of an embodiment of a support anchor and a support anchor cover according to the present disclosure.
Figure 7:
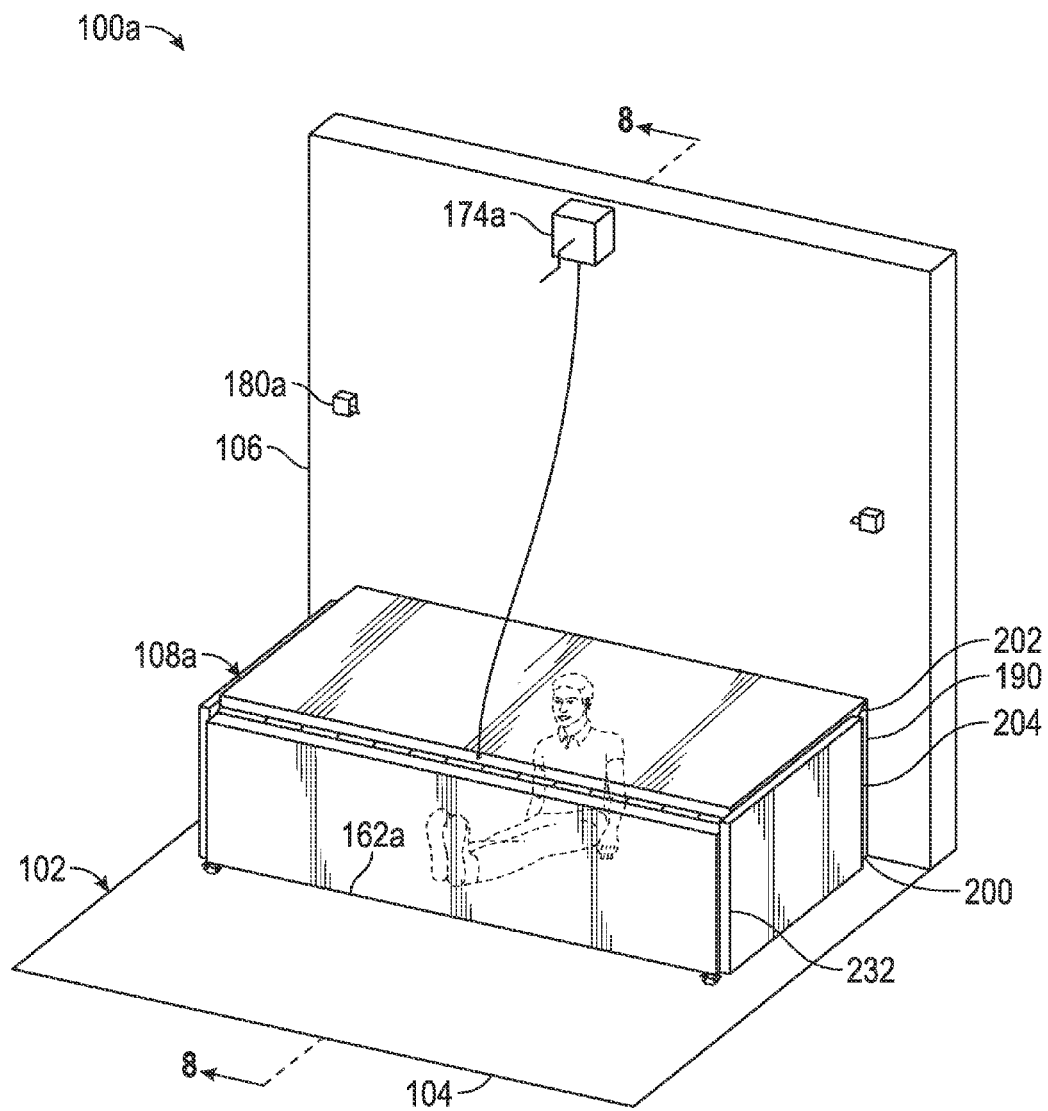
FIG. 7 is a perspective view of another embodiment of a stowable shelter system according to the inventive concepts disclosed herein shown in the deployed position.
Figure 8:
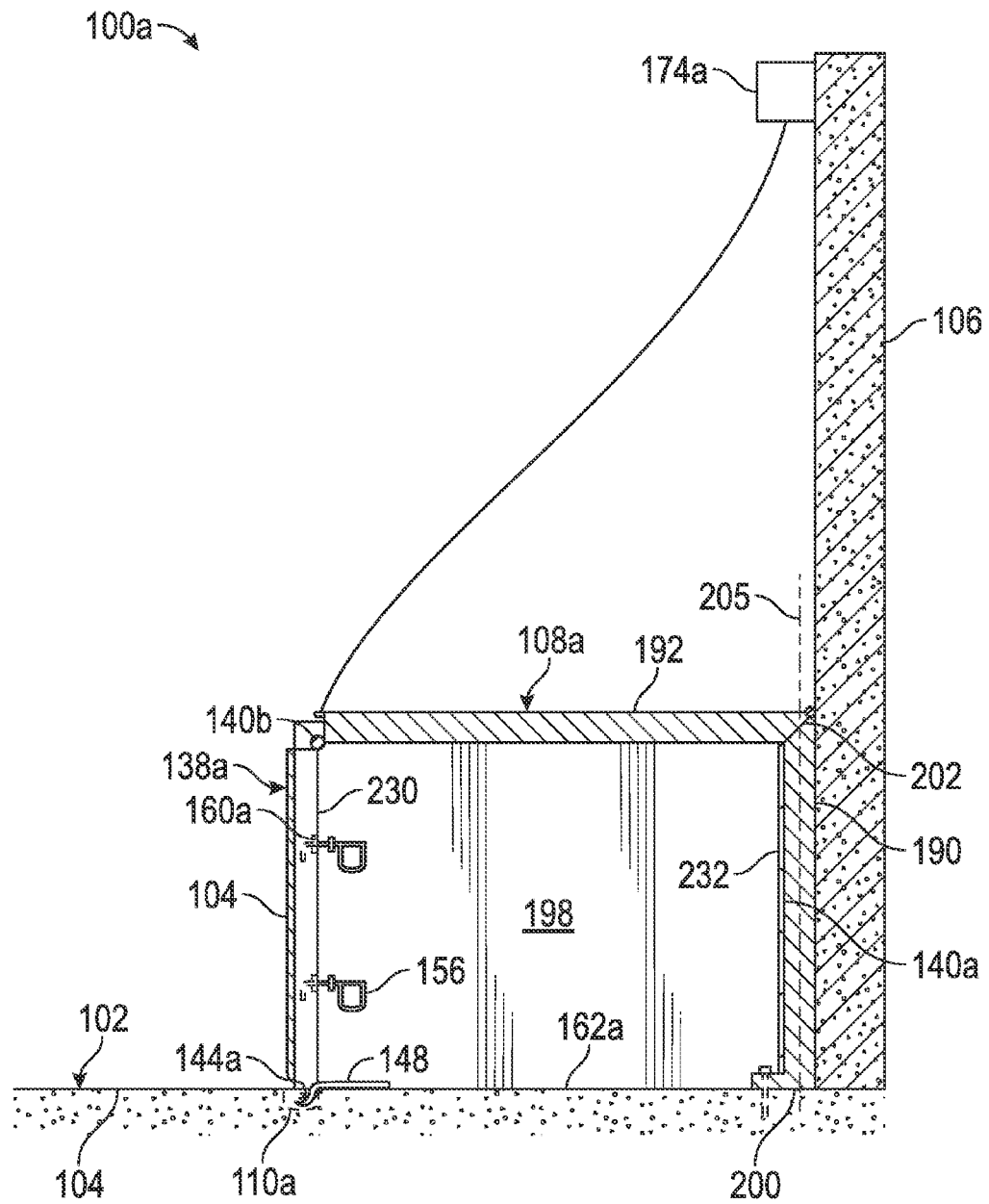
FIG. 8 is a cross-sectional view taken along line 8-8 of FIG. 7.
Figure 9:
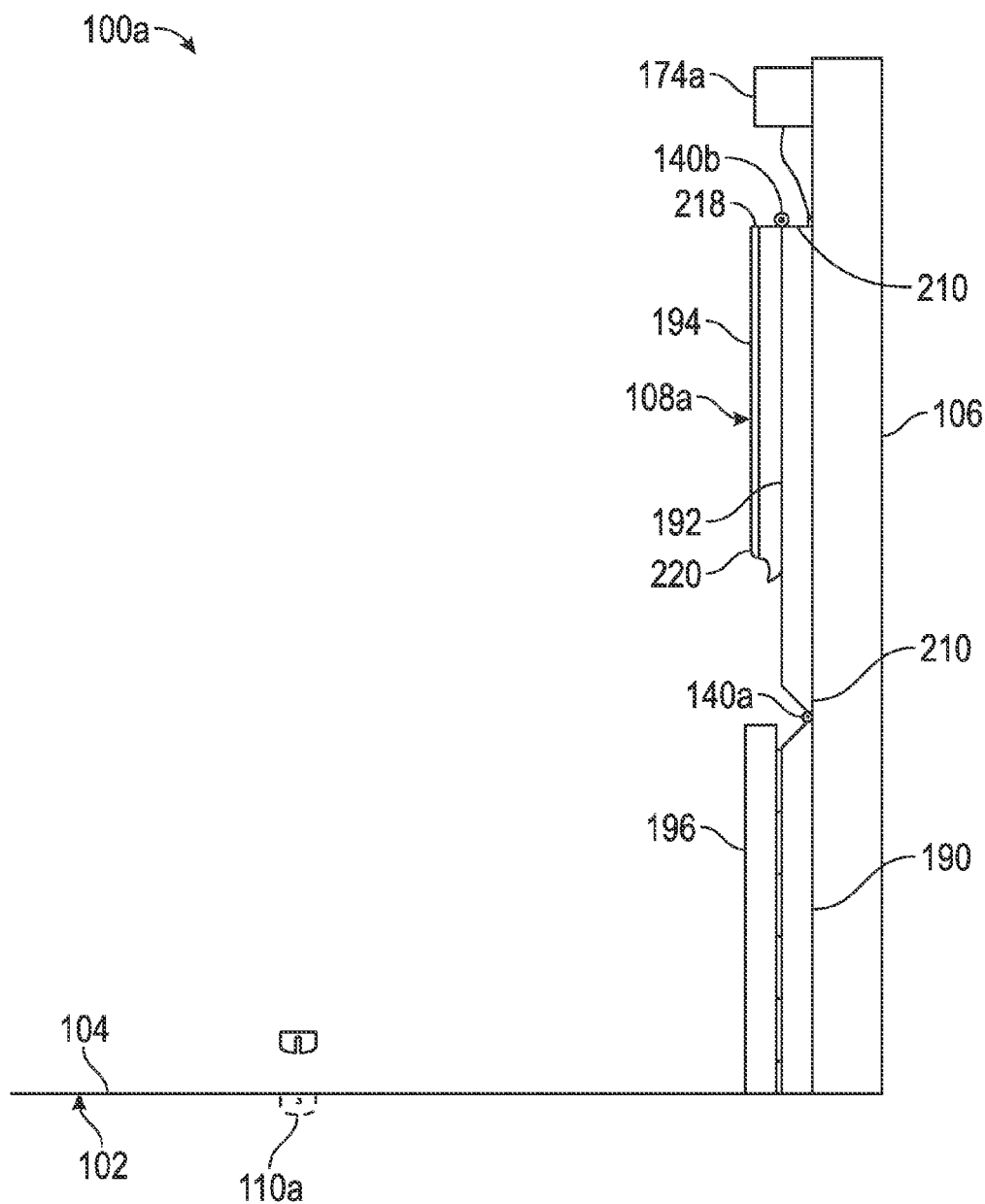
FIG. 9 is a side view of the stowable shelter system of FIG. 7 shown in the slowed position.
Figure 10:
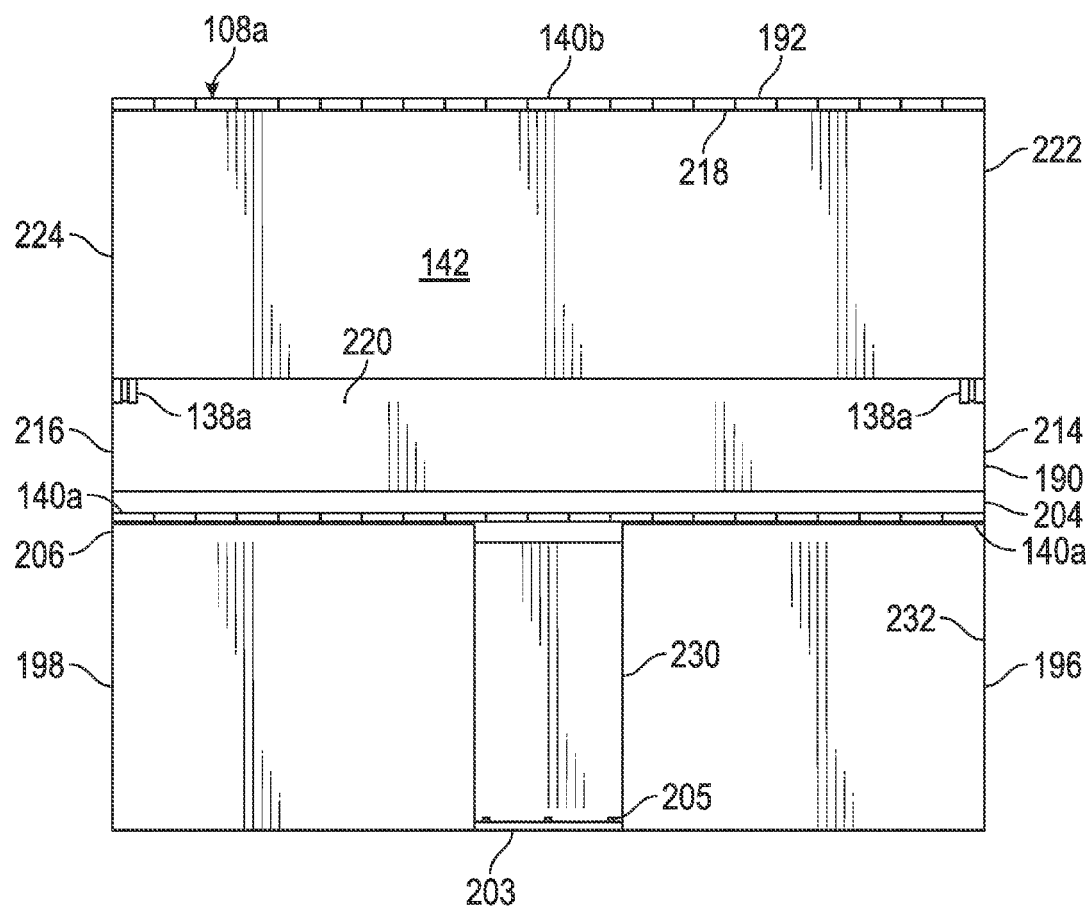
FIG. 10 is a front view of an embodiment of a stowable shelter assembly according to the inventive concepts disclosed herein.

Referring now to FIG. 6, an embodiment of a support anchor 110 is attached to the horizontal portion 104 of the support 102 at a distance from the first member 112, the support anchor 110 for matingly engaging with the anchoring member 138. The support anchor 110 includes an anchor pin 170 extending therein and may be attached to the support 102 in any desired manner, such that the support anchor 110 is substantially level with the horizontal portion 104 of the support 102. For example, the support anchor 110 may be embedded or encased in the support 102, or may be attached thereto in any desired manner, such as via welds, joints, seams, one or more fasteners, adhesives, or combinations thereof, for example. The anchor pin 170 is sized and configured so the anchor pin 170 may be selectively engaged with the anchor-engaging portion 146 of the anchoring end 144 and such that the anchor pin 170 may be retained, locked, or engaged with the anchor-engaging portion 146 by the locking lever 148 when the locking lever 148 is moved in a locked position such that the locking lever 148 is angled relative to the anchoring member 138 as shown in FIG. 2.

A support anchor cover 172 is configured to matingly received in the support anchor 110 when the stowable shelter assembly 108 is in the stowed position such that the support anchor cover 172 is substantially level with the horizontal portion 104 of the support 102 so as to cover the support anchor 110 and to prevent users from tripping or falling into the support anchor 110 as will be appreciated by persons of ordinary skill in the art having the benefit of the instant disclosure. The support anchor cover 172 may be constructed of any desired material, such as metals, alloys, non-metals, polymers, elastomeric materials and may include a gripping portion 173 to enable users to remove the support anchor cover 172 from the support anchor 110 in some embodiments.

Referring back to FIG. 1, in some embodiments, an actuating mechanism 174 may be supported by the vertical portion 106 of the support 102 and is operably coupled with the stowable shelter assembly 108 for moving the stowable shelter assembly 108 between the stowed position and the deployed position. In some embodiments the actuating mechanism 174 may be implemented as a manual or powered winch including a crank or handle 175 and a cable 176 (e.g., a gear reduction cable) coupled with the second member 114 via an attachment member 178, and one or more pulleys 177. In some embodiments, the actuating mechanism 174 may be implemented as any desired actuating, dampening, and/or biasing mechanism, such as a linear actuator, a torsion spring system, a garage door opener, a geared actuator, a pneumatic actuator, a hydraulic actuator, a gear reduction cable winch, a cable counterweight system, or combinations thereof. Further, in some embodiments, the actuating mechanism 174 may be omitted.

In some embodiments, a locking mechanism 180 may be implemented to securely lock the stowable shelter assembly 108 in the stowed position. For example, the locking mechanism 180 may be supported by the vertical portion 106 of the support 102 and may be configured to engage the second member 114 when the stowable shelter assembly 108 is in the stowed position. In some embodiments, the locking mechanism 180 may include a key or keypad requiring a code, such that misuse or tampering with the stowable shelter assembly 108 may be prevented by unauthorized users. In some embodiments, the locking mechanism 180 may be implemented as a deadbolt latch, a hook latch, a crossbar, a cabin hook latch, a cam lock latch, or combinations thereof, while in some embodiments, the locking mechanism 180 maybe omitted.

It is to be appreciated that the stowable shelter system 100 may be installed in any desired building or structure during construction, or may be easily retrofitted to existing buildings or structures. Further, the stowable shelter system 100 may be shipped with the stowable shelter assembly 108 fully or partially assembled, or with the stowable shelter assembly 108 fully or partially disassembled in the form of a kit, as will be readily appreciated by persons of ordinary skill in the art having the benefit of the instant disclosure.

A user, such as a teacher in a classroom with one or more students, for example, may use the stowable shelter system 100 as follows. Under ordinary circumstances, the stowable shelter system 100 is maintained with the stowable shelter assembly 108 secured in the stowed position and with support anchor covers 172 covering the support anchors 110. In some instances, the surface 142 may be utilized as a writing board or a projection surface in a classroom. If a tornado or other alarm or evacuation signal is sounded the teacher may unlock the locking mechanism 180 as appropriate and remove the support anchor covers 172 from the support anchors 110. The teacher may unfold the side member 116 and side member 118. The teacher may then operate the actuating mechanism 174 to move the stowable shelter assembly 108 to the deployed position and to lock the anchoring end 144 of the anchoring member 138 in the support anchors 110 such as by engaging the anchor-engaging portions 146 into place with the locking levers 148. The teacher may engage the side member 116 with the anchoring member 138 via the latching mechanism 156. The students and the teacher may then enter the shelter space 162 (e.g., via the open side member 118) and may pivot the side member 118 and engage the side member 118 with the anchoring member 138 to substantially completely enclose the shelter space 162 and protect the occupants of the shelter space 162. Once inside the shelter space 162 the teacher and students may remain comfortably seated until the threat has passed and/or the evacuation has ended. Then, the teacher may disengage one or both of the side members 116 and 118 and exit the shelter space 162.

To stow the stowable shelter assembly 108, a user simply reverses the above steps to move and lock the stowable shelter assembly 108 in the stowed position and to insert the support anchor covers 172 in the support anchors 110.

As will appreciated by persons of ordinary skill in the art, one or more air vents, one or more light sources, emergency supplies, or any other desired accessories may be provided in any of the first member 112, second member 114 and side members 116 and 118, so as to ventilate or illuminate the interior of the shelter space 162. Further, the stowable shelter system 100 may be implemented in homes, garages, hospitals, colleges, offices, public transportation station, restaurants, stores, or at any other desired location. Stowable shelter systems according to the inventive concepts disclosed herein are securely attached to the support 102 at two or more anchor points or attachment locations, and may be sized and dimensioned to protect any desired number of humans and/or pets, as will be appreciated by persons of ordinary skill in the art having the benefit of the instant disclosure.

Referring now to FIGS. 7-10, shown therein is an embodiment of a stowable shelter system 100a. The stowable shelter system 100a may be implemented similarly to the stowable shelter system 100 and includes a stowable shelter assembly 108a and or more support anchors 110a. The stowable shelter system 100a is configured to be attached to a support 102 having a horizontal portion 104 and a vertical portion 106 as described above.

The stowable shelter assembly 108a includes a back member 190, a top member 192, a front member 194, and a side members 196 and 198.

The back member 190 may be implemented similarly to the first member 112 and includes a bottom end 200, a top end 202, and sides 204 and 206 extending between the top end 202 and the bottom end 200 and defining a plane 208. The bottom end 200 is attachable to the support 102 such that the top end 202 extends a first distance above the support 102, for example, via a flange 203 and fasteners 205.

The top member 192 may be implemented similarly to the second member 114 and has a back end 210 pivotably coupled with the top end 202 of the back member 190 via a hinge 140a, a front end 212 separated a distance from the back end 210, and sides 214 and 216 extending between the back end 210 and the front end 212.

The front member 194 may be implemented similarly to the second member 114 and has a first end pivotably coupled with the front end 212 of the top member 192 via a hinge 140b, a second end 220, sides 222 and 224 extending between the first end 218 and the second end 220, and anchoring members 138a extending at least partially past the second end 220 for anchoring the front member 194 to the support 102. In some embodiments, the front member 194 may include a surface 142a (FIG. 10) which may be implemented similarly to the surface 142. In some embodiments, the front member 194 maybe omitted and the anchoring members 138 may be pivotably coupled with the top member 192 via the hinge 140a as will be appreciated by persons of ordinary skill in the art.

The stowable shelter assembly 108a is movable between a stowed position where the top member 192 and the back member 190 are coplanar with one another and the front member 194 is substantially parallel to the top member 192 such that the second end 220 of the front member 194 is positioned at a distance above the bottom end 200 of the back member 190, and a deployed position where the top member 192 and the back member 190 are angled at an angle of about 90° relative to one another, and the anchoring member 138a is positioned at least partially below the bottom end 200 of the back member 190 and spaced a distance from the bottom end 200 such that the back member 190, the top member 192, and the front member 194 cooperate with one another to define a shelter space 162a.

The side member 196 may be implemented similarly to the side member 116, and includes a side 226 and end 228, the end 228 pivotably coupled with the side 204 of the back member 190 via a hinge 154b so that the side member 196 is movable between a first position where the side member 196 is substantially parallel to the plane 208 defined by the back member 190 when the stowable shelter assembly 108a is in the stowed position, and a second position where the side member 196 is angled relative to the back member 190 and the side 226 is releasably engageable with the anchoring member 138a when the stowable shelter assembly 108s is in the deployed position such that the shelter space 162a is further defined by the side member 196. The side member 196 may be substantially rectangular or substantially square in shape in some embodiments.

The side member 196 may include a latching mechanism 156b which may be implemented and may function similarly to the latching mechanism 156 described above.

The side member 198 may be implemented similarly to the side member 196 and includes a side 230 and an end 232, the end 232 pivotably coupled with the side 206 of the back member 190 via a hinge 154c so that the side member 198 is movable between a first position where the side member 198 is substantially parallel to the plane 208 defined by the back member 190 when the stowable shelter assembly 108a is in the stowed position, and a second position where the side member 198 is angled relative to the back member 190 and the side 230 is releasably engageable with the anchoring member 138a when the stowable shelter assembly 108a is in the deployed position such that the shelter space 162a is further defined by the side member 198.

The side member 198 may include a latching mechanism 156c which may be implemented and may function similarly to the latching mechanism 156 described above.

Referring back to FIG. 7, in some embodiments, an actuating mechanism 174a may be supported by the support 102, and may be coupled with the vertical portion 106 of the support 102 and operably coupled with the stowable shelter assembly 108a for moving the stowable shelter assembly 108a between the stowed position and the deployed position. In some embodiments the actuating mechanism 174a may be implemented similar to the actuating mechanism 174 and may include a crank or handle 175a and a cable 176a coupled with the top member 192 via an attachment member 178a and one or more pulleys 177a. Further, in some embodiments, the actuating mechanism 174a may be omitted.

In some embodiments, a locking mechanism 180a may be implemented to securely lock the stowable shelter assembly 108a in the stowed position. For example, the locking mechanism 180a may be implemented similarly to the locking mechanism 180 and may be supported by the vertical portion 106 of the support 102. The locking mechanism 180a may be configured to engage the top member 192 when the stowable shelter assembly 108a is in the stowed position and/or the top member 192 is positioned so as to be substantially coplanar with the back member 190 as described above. In some embodiments, the locking mechanism 180a maybe omitted, as will be appreciated by persons of ordinary skill in the art having the benefit of the instant disclosure.

The support anchor 110a may be implemented and function similarly to the support anchor 110 described above, and may include a support anchor cover 172 in some embodiments.

A user may use the stowable shelter system 100a similarly to the stowable shelter system 100 as described above.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. stowable shelter assembly, comprising:
a first member having a bottom end, a top end, and first and second sides extending between the top end and the bottom end and defining a plane, the bottom end attachable to a support at a first anchor point such that the top end extends a first distance above the support; and
a second member having a back end pivotably coupled with the top end of the first member, a front end separated a second distance from the back end, and third and fourth sides extending between the back end and the front end, the second member including at least one anchoring member extending at least partially past the front end, the at least one anchoring member for anchoring the second member to the support,
wherein the second member is movable relative to the first member between a stowed position where the first and second members are substantially coplanar with one another such that the front end of the second member is positioned a second distance above the bottom end of the first member, and a deployed position where the first and second members are angled at a first angle relative to one another and the at least one anchoring member is positioned at least partially below the back end of the second member and spaced a third distance from the bottom end of the first member so as to anchor the second member to the support at a second anchor point such that the first and second members cooperate with one another to define a shelter space.

2. The stowable shelter assembly of claim 1, further comprising a first side member having a fifth side and an end pivotably coupled with the first side of the first member so that the first side member is movable between a first position where the first side member is substantially parallel to the plane defined by the first member and a second position where the first side member is angled relative to the first side member so that the fifth side is releasably engageable with the at least one anchoring member when the stowable shelter assembly is in the deployed position such that the shelter space is further defined by the first side member.

3. The stowable shelter assembly of claim 2, further comprising a second side member having a sixth side and an end pivotably coupled with the second side of the first member so that the second side member is movable between a first position where the second side member is substantially parallel to the plane defined by the first member and a second position where the second side member is angled relative to the first member so that the sixth side is releasably engageable with the at least one anchoring member when the stowable shelter assembly is in the deployed position such that the shelter space is further defined by the second side member.

4. A stowable shelter assembly, comprising:
A back member having a bottom end, a top end, and first and second sides extending between the top end and the bottom end and defining a plane, the bottom end attachable to a support at a first anchor point such that the top end extends a first distance above the support;
a top member having a back end pivotably coupled with the top end of the back member, a front end separated a second distance from the back end, and third and fourth sides extending between the back end and the front end; and a front member having a first end pivotably coupled with the front end of the top member, a second end, and fifth and sixth sides extending between the first and second ends, and at least one anchoring member extending at least partially past the second end for anchoring the front member to the support,
wherein the top member and the front member are movable relative to the back member between a stowed position where the top member and the back member are coplanar with one another and the front member is substantially parallel to the top member such that the second end of the front member is positioned at a distance above the bottom end of the back member, and a deployed position where the top member and the back member are angled at a first angle relative to one another, the top member and the front member are angled at a second angle relative to one another and the at least one anchoring member and spaced a third distance from the bottom end so as to anchor the front member to the support at a second anchor point such that the back member, the top member, and the front member cooperate with one another to define a shelter space.

5. The stowable shelter assembly of claim 4, further comprising a first side member having an eighth side and an end, the end pivotably coupled with the first side of the back member so that the first side member is movable between a first position where the first side member is substantially parallel to the plane defined by the back member when the stowable shelter assembly is in the stowed position, and a second position where the first side member is angled relative to the back member and the eighth side is releasably engageable with the at least one anchoring member when the stowable shelter assembly is in the deployed position such that the shelter space is further defined by the first side member.

6. The stowable shelter assembly of claim 5, further comprising a second side member including a ninth side and an end, the end pivotably coupled with the second side of the back member so that the second side member is movable between a first position where the second side member is substantially parallel to the plane defined by the back member when the stowable shelter assembly is in the stowed position, and a second position where the second side member is angled relative to the back member and the ninth side is releasably engageable with the at least one anchoring member when the stowable shelter assembly is in the deployed position such that the shelter space is further defined by the second side member.

7. The stowable shelter assembly of claim 4, wherein the first angle is about 90°.

8. The stowable shelter assembly of claim 7, wherein the second angle is about 90°.

9. The stowable shelter assembly of claim 4, wherein the front member includes at least one surface configured to be used as a writing board.

10. A shelter system for attachment to a support, the shelter system comprising:
a stowable shelter assembly, including:
a first member having a bottom end, a top end, and first and second sides extending between the top end and the bottom end and defining a plane, the bottom end attached to the support at a first anchor point such that the top end extends a first distance above the support;
a second member having a back end pivotably coupled with the top end of the first member, a front end separated a second distance from the back end, and third and fourth sides extending between the back end and the front end, the second member including at least one anchoring member extending at least partially past the front end for anchoring the second member to the support; and at least one support anchor coupled with the support at a second distance from the first anchor point, the support anchor defining at least one second anchor point for matingly engaging with the at least one anchoring member, wherein the first member is movable relative to the second member between a stowed position where the first and second members are coplanar with one another such that the front end of the second member is positioned a third distance above the bottom end of the first member, and a deployed position where the first and second members are angled at a first angle relative to one another and the at least one anchoring member is matingly engaged with the at least one support anchor such that the first and second members cooperate with one another and with the support to define a shelter space.

11. The stowable shelter assembly of claim 10, further comprising a first side member pivotably coupled with the first side of the first member so that the first side member is movable between a first position where the first side member is substantially parallel to the plane defined by the first member and a second position where the first side member is angled relative to the first member so as to be releasably engageable with the at least one anchoring member when the stowable shelter assembly is in the deployed position such that the shelter space is further defined by the first side member.

12. The stowable shelter assembly of claim 11, further comprising a second side member pivotably coupled with the second side of the first member so that the second side member is movable between a first position where the second side member is substantially parallel to the plane defined by the first member and a second position where the second side member is angled relative to the first member so as to be releasably engageable with the at least one anchoring member when the stowable shelter assembly is in the deployed position such that the shelter space is further defined by the second side member.

13. The shelter system of claim 11, wherein the at least one anchoring member includes at least one recess formed therein and wherein the first side member further comprises at least one latching member configured to be matingly received in the at least one recess when the stowable shelter assembly is in the deployed position so as to lock the first side member to the at least one anchoring member.

14. The shelter system of claim 10, further comprising a support anchor cover configured to be matingly received in the support anchor when the stowable shelter assembly is in the stowed position such that the support anchor cover is substantially level with the support.

15. The shelter system of claim 10, wherein the support comprises a vertical portion positioned adjacent to the first member, the shelter system further comprising an actuator coupled with the vertical portion of the support and operably coupled with the stowable shelter assembly for moving the stowable shelter assembly between the stowed position and the deployed position.

16. The shelter system of claim 10, wherein the support comprises a floor of a structure.

17. The shelter system of claim 16, wherein the support comprises a concrete slab.

18. The shelter system of claim 16, wherein the vertical portion of the support comprises a wall of a structure.

* * * * *